(12) United States Patent
Epperson

(10) Patent No.: US 6,567,647 B1
(45) Date of Patent: May 20, 2003

(54) LOW NOISE RADIO FREQUENCY TRANSCEIVERS INCLUDING CIRCULATORS

(75) Inventor: Darrell G. Epperson, Wake Forest, NC (US)

(73) Assignee: Ericsson Inc., Research Triangle Park, NC (US)

( * ) Notice: Subject to any disclaimer, the term of this patent is extended or adjusted under 35 U.S.C. 154(b) by 592 days.

(21) Appl. No.: 09/048,876

(22) Filed: Mar. 26, 1998

(51) Int. Cl.$^7$ ................................................ H04B 1/44
(52) U.S. Cl. ........................................... 455/83; 455/82
(58) Field of Search ............................... 455/83, 82, 84, 455/78; 370/282, 278, 339, 275; 375/219

(56) References Cited

U.S. PATENT DOCUMENTS

| | | | | |
|---|---|---|---|---|
| 5,701,595 A | * | 12/1997 | Green, Jr. ..................... | 455/83 |
| 5,768,690 A | * | 6/1998 | Yamada et al. ................ | 455/83 |
| 5,805,023 A | * | 9/1998 | Fukuden ....................... | 330/302 |
| 5,896,563 A | * | 4/1999 | Kawanami et al. ............ | 455/83 |
| 5,915,212 A | * | 6/1999 | Przelomiec et al. ........... | 455/83 |
| 5,923,647 A | * | 7/1999 | Dolman et al. ................ | 455/83 |
| 5,926,749 A | * | 7/1999 | Igarashi et al. ............... | 455/127 |
| 6,011,980 A | * | 1/2000 | Nagano et al. ............... | 455/572 |

OTHER PUBLICATIONS

"Fields and Waves in Communication Electronics", Ramo et al., John Wiley & Sons, Inc., pp. 529–533.*

Ramo et al., *"Fields and Waves in Communication Electronics"*, John Wiley & Sons, Inc., pp. 529–533.

* cited by examiner

Primary Examiner—William Trost
Assistant Examiner—Rafael Perez-Gutierrez
(74) Attorney, Agent, or Firm—Myers Bigel Sibley & Sajovec

(57) ABSTRACT

A radio frequency (RF) transceiver includes a transmit chain that transmits a transmit signal to an antenna and a receive chain that generates a receive signal from the antenna, wherein the receive chain includes a duplexer and the transmit chain is free of a duplexer. By removing the duplexer from the transmit chain, power losses incurred by the duplexer may be reduced and preferably eliminated from the transmit chain. More specifically, an RF transceiver includes a circulator having first, second and third circulator ports, that circulates power from the first circulator port to the second circulator port, to the third circulator port and then to the first circulator port. An amplifier is coupled to the first circulator port and amplifies a transmit signal. An antenna is coupled to the second circulator port. A duplexer is coupled to the third circulator port and generates a receive signal. Accordingly, the combination of a circulator in the transmit chain and a duplexer in the receive chain can reduce the power losses in the transmit chain. Noise may be reduced by replacing the amplifier with first and second amplifiers and a bandpass filter. The first amplifier is coupled to the transmit signal and the second amplifier is coupled to the first circulator port. By providing a bandpass filter between the first and second amplifiers, lower noise may be obtained while still maintaining the same gain.

12 Claims, 2 Drawing Sheets

LOW NOISE RADIO FREQUENCY TRANSCEIVERS INCLUDING CIRCULATORS

FIELD OF THE INVENTION

This invention relates to radio frequency (RF) communication systems, and more specifically to RF transceivers for RF communication systems.

BACKGROUND OF THE INVENTION

Radio frequency communication systems are being widely used for wireless communications. As is well known to those having skill in the art, radio frequency communication systems include wireless communication terminals that communicate with one another and with wire telephone systems. Radio frequency communication systems include analog and digital cellular telephone systems, and satellite telephone systems. Wireless communications terminals include analog and digital cellular terminals, satellite terminals and multiple mode cellular/satellite terminals. These wireless communications terminals may be simple wireless radiotelephones. However, more sophisticated personal communications systems (PCS), that provide functions in addition to those of a telephone, such as facsimile, data communications, data processing, word processing and other personal communications systems functions are also included.

Wireless communication terminals continue to undergo miniaturization. At the same time, higher performance and longer battery life are also generally desirable. Accordingly, there continues to be a need for improved designs of RF transceivers that are used in wireless communication terminals. As is well known to those having skill in the art, a transceiver generally includes a transmitter and receiver to transmit communications via an antenna and to receive the communications from the antenna. The antenna may include multiple antenna elements.

FIG. 1 is a block diagram of a conventional RF transceiver. As shown in FIG. 1, the RF transceiver 100 receives a transmit signal $F_O$ from a transmit circuit of a wireless communication terminal and transmits this signal to antenna 208. A received signal from antenna 208 is also provided to a receive circuit.

As also shown in FIG. 1, the transceiver includes an amplifier 202, an isolator 204 and a duplexer 206. As is well known to those having skill in the art, an isolator 204 is a device that permits radio frequency energy to pass in one direction indicated by the arrow in Block 204, while providing high isolation to reflected energy in the reverse direction. As is also known to those having skill in the art, an isolator may be produced using a microwave circulator with one port terminated in the characteristic impedance. Accordingly, ports 1 and 2 of isolator 204 couple amplifier 202 to transmit port (Tx) of duplexer 206. Port 3 of isolator 204 is terminated by a characteristic impedance R.

Duplexer 206 couples the transmit port Tx and receive port Rx to antenna 208 via antenna port Ant. As is well known to those having skill in the art, a duplexer is a radio frequency device that isolates a receiver from a transmitter while allowing them to share a common antenna. A duplexer generally includes a transmit filter and a receive filter that are coupled to an antenna input. The design of a conventional transceiver 100 and of individual blocks 202, 204, 206 and 208 are well known to those having skill in art and need not be described further herein.

The transmitter portion of a transceiver is often a large power consumer in a wireless communication terminal due to the need to transmit RF communications with sufficient power to be received properly. Moreover, the RF transmitter may degrade performance of the wireless communication terminal due to the introduction of noise in the transmitted signal. Accordingly, there continues to be a need for improved RF transceivers, and more specifically RF transmitters therefor.

SUMMARY OF THE INVENTION

It is therefore an object of the present invention to provide improved radio frequency (RF) transceivers and wireless communication terminals including the same.

It is another object of the present invention to provide RF transceivers and wireless communication terminals that can operate with reduced power and can produce lower noise.

These and other objects are provided according to the present invention, by an RF transceiver that includes a transmit chain that transmits a transmit signal to an antenna and a receive chain that generates a receive signal from the antenna, wherein the receive chain includes a duplexer and the transmit chain is free of a duplexer. By removing the duplexer from the transmit chain, power losses incurred by the duplexer may be reduced and preferably eliminated from the transmit chain.

More specifically, an RF transceiver according to the present invention comprises a circulator including first, second and third circulator ports, that circulates power from the first circulator port to the second circulator port, to the third circulator port and then to the first circulator port. A transmit signal is coupled to the first circulator port, preferably via at least one amplifier. An antenna is coupled to the second circulator port. A duplexer is coupled to the third circulator port and generates a receive signal. Accordingly, the combination of a circulator in the transmit chain and a duplexer in the receive chain can reduce the power losses in the transmit chain.

According to another aspect of the present invention, noise may be reduced by replacing the amplifier with first and second amplifiers and a bandpass filter therebetween. The first amplifier is coupled to the transmit signal and the second amplifier is coupled to the first circulator port of the circulator. By providing a bandpass filter between the first and second amplifiers, lower noise may be obtained while still maintaining the same gain.

In a preferred embodiment of the present invention, the duplexer includes an antenna port, a transmit port and a receive port. The third circulator port is coupled to the antenna port, and the receive port accepts the receive signal. An impedance matching resistor is coupled to the transmit port in order to dissipate power that is reflected from the antenna.

Radio frequency transceivers according to the present invention may be used in a wireless communication terminal that includes a transmit circuit, a receive circuit, a user interface and a controller that is coupled to the user interface, the transmit circuit and the receive circuit. The RF transceiver includes an amplifier that is coupled between the transmit circuit and the first circulator port, an antenna that is coupled to the second circulator port, and a duplexer that is coupled between the third circulator port and the receive circuit. Accordingly, high gain, low noise transceivers may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "coupled" indicates that a first element is connected to a second element either by a direct electrical connection, by an electromagnetic connection such as an optical connection or by one or more indirect electrical and/or electromagnetic connections, wherein other intervening elements are included.

Figure 2:
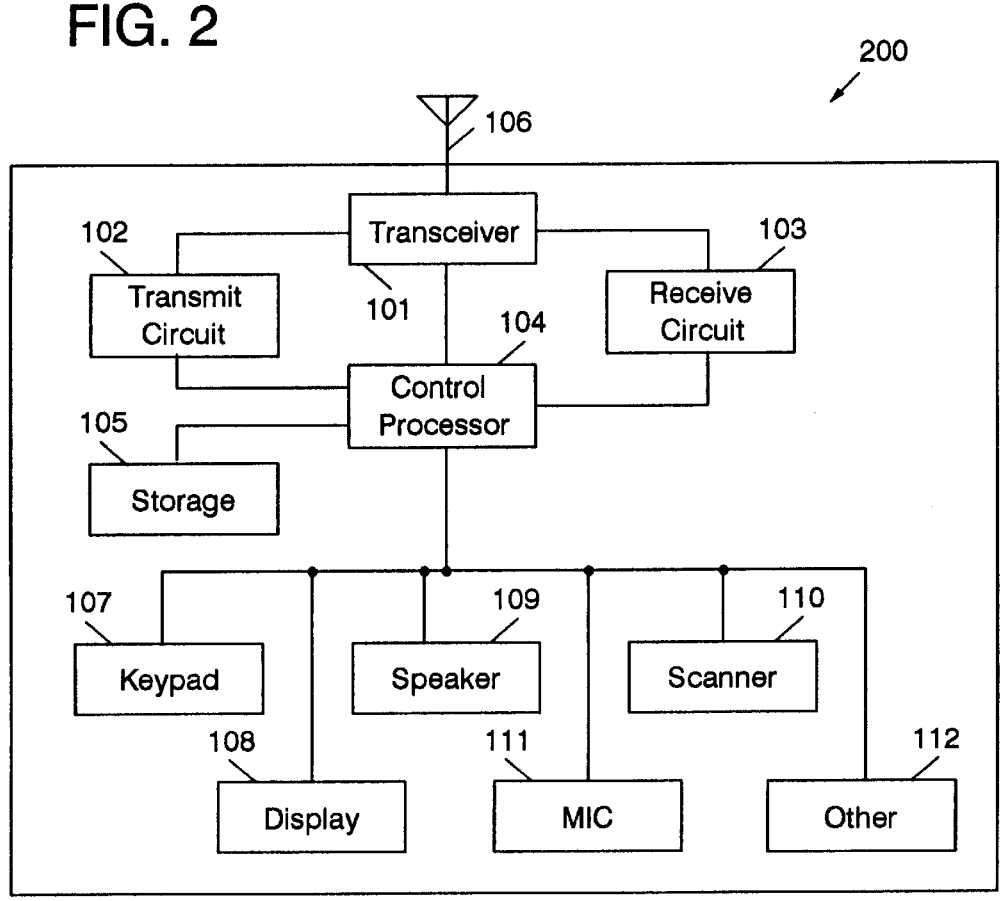
FIG. 2 is a simplified block diagram of wireless communication terminals according to the invention.

Referring now to FIG. 2, a simplified block diagram of wireless communication terminals according to the present invention is shown. As shown in FIG. 2, wireless communication terminal 200 can be a cellular phone, a satellite phone, or a high function terminal that provides functions in addition to those of a cellular telephone, such as facsimile, data communications, data processing, word processing, and other personal communications systems functions. These high function cellular radiotelephones are often referred to as personal communications systems (PCS). Multiple mode wireless communication terminals that embody two or more of these functions are also included.

As shown in FIG. 2, wireless communication terminal 200 includes a transceiver 101 that is coupled to antenna 106. As will be described in detail below, transceiver 101 includes a transmit chain that transmits a transmit signal to the antenna 106 and a receive chain that generates a receive signal from the antenna 106. As will also be described below, the receive chain includes a duplexer and the transmit chain is free of a duplexer.

Still referring to FIG. 2, wireless communication terminal 200 also includes a control processor 104 and storage (memory) 105 that is coupled to control processor 104 to provide a storage capacity for program and data information. As further shown in FIG. 2, terminal 200 also generally includes a user interface including a keypad 107, a display 108, a speaker 109 and a microphone 111. In order to provide a wireless communications terminal for receiving transmission of audio, video data and/or multimedia signals, keypad 107 may be a full scale personal computer keyboard, and display 108 may be a large graphics display. A scanner 110 may also be provided, as may other devices 112, such as disk drives and modems to provide a PCS terminal. Transmit circuit 102 and receive circuit 103 are also coupled to transceiver 101 and to control processor 104, to perform transmit and receive signal processing respectively.

The design of transceiver 101 according to the present invention will be described in detail below. It will be recognized that the other elements of terminal 200 are well known to those having skill in the art and need not be described further herein. Moreover, any and all of the elements of FIG. 2 may be embodied using one or more analog or digital integrated circuits, microprocessors that run a stored program, application-specific integrated circuits (ASIC), or any other combination of hardware and/or software.

Figure 3:
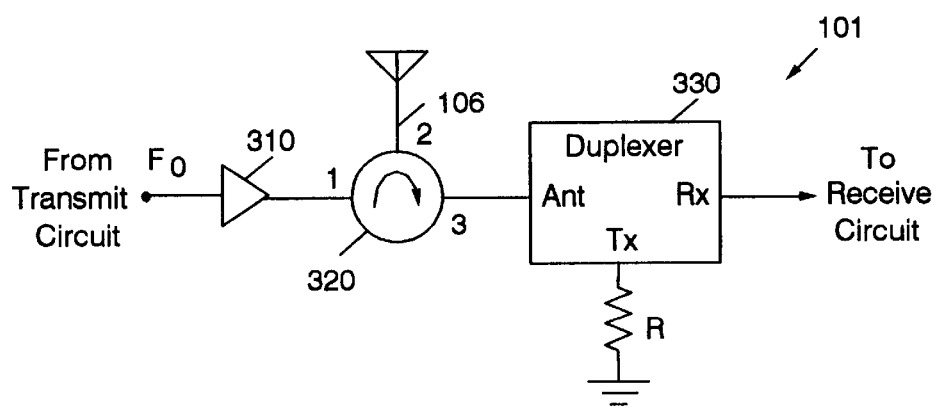
FIG. 3 is a block diagram of first embodiments of RF transceivers according to the invention.

Referring now to FIG. 3, a first embodiment of transceivers 101 according to the present invention will now be described. As shown in FIG. 3, a transceiver 101 includes a circulator 320 having first, second and third circulator ports 1, 2 and 3 respectively, that circulates power from the first circulator port 1 to the second circulator port 2, to the third circulator port 3 and then back to the first circulator port 1, in the direction shown by the arrow in Block 320. It will be understood that the labeling of the circulator ports is arbitrary, as long as power is circulated among the ports in the direction of the arrow. An amplifier 310 amplifies a transmit signal $F_0$ that is received from transmit circuit 102 (FIG. 2). Amplifier 310 is coupled to the first circulator port 1. An antenna 106 is coupled to the second circulator port 2.

An antenna port (Ant) of duplexer 330 is coupled to the third circulator port 3. Duplexer 330 generates a receive signal at the receive port (Rx) thereof, which is provided to the receive circuit 103. A terminating resistor R is also provided to dissipate power at the transmit port ($T_x$) of the duplexer 330.

Figure 1:
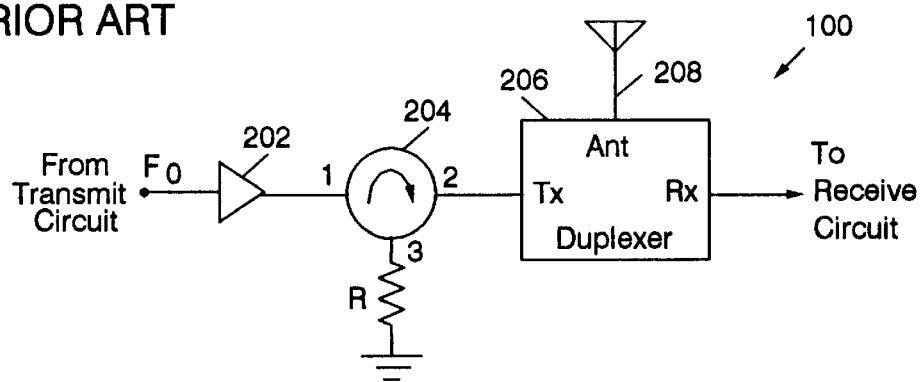
FIG. 1 is a block diagram of a conventional RF transceiver.

It will be understood that each of the individual elements 106, 310, 320 and 330 of FIG. 3 are well known to those having skill in the art, and their internal design need not be described further. It will also be understood that the amplifier 310, the first and second ports of the circulator 320 and the antenna 106 form a transmit chain that transmits the transmit signal $F_0$ to the antenna 106. The antenna 106, the second and third ports of the circulator 320 and the duplexer 330 form a receive chain. Accordingly, the transmit chain is free of a duplexer and the receive chain includes a duplexer 330. This sharply contrasts with a conventional transceiver wherein a duplexer is used in both the transmit and the receive chains according to its conventional function, as shown in FIG. 1. By removing the duplexer from the transmit chain, the gain requirements in the transmit chain may be reduced by the amount of the insertion loss of the duplexer 330. Lower power may thereby be used.

Figure 4:
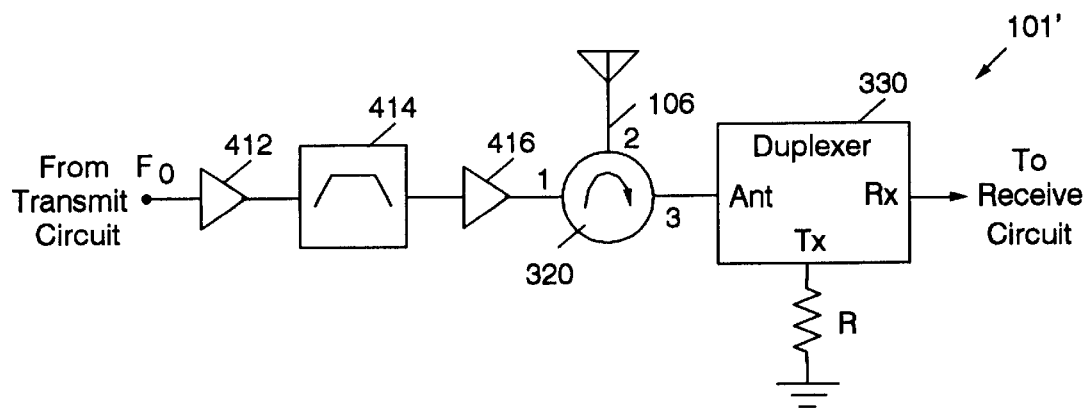
FIG. 4 is a block diagram of second embodiments of RF transceivers according to the invention.

FIG. 4 illustrates a second embodiment of transceivers according to the present invention. As shown in FIG. 4, a transceiver 101' includes an antenna 106, a circulator 320 and a duplexer 330 as described in connection with FIG. 3. However, the amplifier 310 of FIG. 3 is replaced by a pair of amplifiers 412 and 416 with a bandpass filter 414 therebetween. It has been found, according to the invention, that by splitting the gain provided by amplifier 310 of FIG. 3 into a pair of amplifiers 412 and 416 with a bandpass filter 414 therebetween, noise generated by the first amplifier 412 can be filtered so that amplifier 416 can produce less noise than a single amplifier 310 of FIG. 3. Thus, low noise operation may be maintained. It will also be understood that although FIG. 4 illustrates two amplifiers 412 and 416, more than two amplifiers may be used. It will also be understood that the two or more amplifiers 412 and 416 need not provide the same gain as amplifier 310 of FIG. 3.

A theoretical discussion and a simplified example of potential advantages of transceivers according to the present invention will now be described. However, it will be understood that the scope of the present invention is defined by the claims and equivalents thereto.

A conventional transceiver 100 of FIG. 1 receives a transmit signal $F_0$ of level +1 dBm. Sufficient filtering is generally provided for transmit signal $F_0$ to reduce out-ofband noise to minimum noise levels. Specifically, the noise of the transmit signal $F_0$ may be equal to kTB, where k is Boltzman's constant, T is room temperature in degrees Kelvin and B is the bandwidth of the channel. This noise level is generally about −129 dBm for conventional cellular applications, such as AMPS and DAMPS.

The power amplifier 202 of FIG. 1 generally provides +28 dB of amplification, so that the signal emerging from the power amplifier 202 is at +29 dBm and the noise is also amplified to be at −95 dBm. The signal emerging from the power amplifier 202 is then passed to isolator 204. The isolator generally provides a 1 dB loss. The isolator 204 is coupled to duplexer 206 and to antenna 208. Duplexer 206 generally provides a 2 dB loss in the Tx band, so that the transmit signal at the antenna 208 is generally at +26 dBm, and 36 dB loss in the Rx band to attenuate the Tx and Rx band noise.

According to the invention, as shown in FIG. 3, by removing the duplexer 330 from the transmit chain, the 2 dB insertion loss of the duplexer can be eliminated. Accordingly, higher transmit power may be provided or reduced gain and power may be used in the transmit chain. However, the transmit output noise at −95 dBm may still be undesirably high.

According to the invention, as shown in FIG. 4, the output noise may be reduced by splitting the power amplifier into two amplifiers 412 and 416 with a bandpass filter 414 therebetween. In one embodiment, the amplifier 310 with a gain of +28 dB is split into a first amplifier 412 with a gain of +18 dB and a second amplifier 416 with a gain of +10 dB. Accordingly, the same overall gain may be provided. However, bandpass filter 414 filters out of band noise. More specifically, if the transmit input signal $F_0$ has noise at −129 dBm, the bandpass filter 414 may lower the out of band noise by 30 dB. Accordingly, after 18 dB of amplification of signal and noise by amplifier 412, the noise output of the bandpass filter can still be at −129 dBm.

It will be understood that the bandpass filter 414 may introduce 2 dB of loss in the transmit chain. However, since the duplexer 330 is removed from the transmit chain, this loss may be compensated. The second amplifier 416 may produce 10 dB of amplification so that the output thereof at port 1 of the circulator is at +27 dBm and the noise is at −114 dBm. The circulator may introduce a −1 dB loss between ports 1 and 2. Accordingly, at the antenna 106 of FIG. 4, a signal of +26 dBm may be provided and the noise level may be down at −114 dBm. This contrasts with the transceiver of FIG. 1, where the noise is down at −95 dBm.

Stated differently, by splitting the power amplifier 310 into two amplifiers 412 and 416, the noise power produced in the first power amplifier 412 can be filtered to kTB levels again before amplification by the second amplifier 416. Thus, the output noise level can be greatly reduced, and the filter requirement in the duplexer 330 may also be reduced. The noise level from the amplifier can be reduced from −95 dBm to −114 dBm. Specifically, the noise figure of the final stage is 5 dB and after amplification of 10 dB produces 15 dB of noise above kTB levels, so that the output of the second amplifier 416 is at −114 dBm.

As shown in FIGS. 3 and 4, the isolator 204 of FIG. 1 is replaced by a circulator 320. The antenna 106 is connected to the second port of the circulator 320. The dump resistor port (3) of the circulator is then connected to the antenna port of the duplexer 330. The circulator offers 18 dB of attenuation at the dump port (3) when the antenna 106 presents a matched load. The duplexer 330 provides additional attenuation of 45 dB at the fundamental Tx frequency to protect the receiver front end from overload. The noise power from the power amplifier can also be reduced to below kTB levels, and no de-sense of the received signal need occur.

In order to provide for mismatched antenna conditions, a resistor R, such as a 50Ω matching resistor, may be connected to the transmit port (Tx) of the duplexer 330. The resistor R provides a termination for reflected fundamental frequency power. The Rx band noise is also generally reflected from a mismatched antenna. This noise may pass through the circulator back to the duplexer input. This noise may then continue through the duplexer to the receive front end. Generally, the mismatched condition of the antenna may produce a voltage standing wave ratio (VSWR) of less than 2:1. This provides a 10 dB return loss of energy presented to the antenna. Thus, noise power of −115 dBm presented to the antenna is reflected back to the circulator at a level 10 dB lower, i.e. at −125 dBm. This is summed with the noise figure of the receiver to produce an increase in the overall noise floor of the receiver.

A typical cellular receiver has a noise figure of around 8 dB. Thus, the noise floor is −129 dBm+8 dB or −121 dBm. This can produce a receiver sensitivity of −118 dBm, assuming a carrier-to-noise ratio (C/N) of 3 dB is used. With the addition of the transmit noise power of −125 dBm, this noise floor is elevated 1.46 dB during the mismatched condition. The resultant sensitivity of the receiver may then be degraded by 1.46 dB to −116.54 dBm when the antenna is mismatched to a VSWR of 2:1. However, the Telecommunications Industry Association (TIA) standard specification for AMPS mode sensitivity is −116 dBm. Accordingly, even though the duplexer is now placed in the receive circuit, adequate noise margin in the receive circuit may be maintained. High performance, low noise transceivers may thus be provided for wireless communication terminals.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless communication terminal comprising:
    a transmit circuit;
    a receive circuit;
    a user interface;
    a controller that is coupled to the user interface, the transmit circuit and the receive circuit; and
    a radio frequency (RF) transceiver comprising:
        a circulator including first, second and third circulator ports, that circulates power from the first circulator port to the second circulator port to the third circulator port and then to the first circulator port;
        first and second amplifiers and a bandpass filter therebetween, the first amplifier being coupled to the transmit circuit and the second amplifier being coupled to the first circulator port;
        an antenna that is coupled to the second circulator port; and
        a duplexer that is coupled between the third circulator port and the receive circuit.

2. A wireless communication terminal according to claim 1 wherein the duplexer includes an antenna port, a transmit port and a receive port, wherein the third circulator port is coupled to the antenna port and wherein the receive port is coupled to the receive circuit.

3. A wireless communication terminal according to claim 2 further comprising a resistor that is coupled to the transmit port.

4. A radio frequency (RF) transceiver comprising:
- a circulator including first, second and third circulator ports, that circulates power from the first circulator port to the second circulator port to the third circulator port and then to the first circulator port;
- first and second amplifiers and a bandpass filter therebetween, the first amplifier being coupled to a transmit signal and the second amplifier being coupled to the first circulator port;
- an antenna that is coupled to the second circulator port; and
- a duplexer that is coupled to the third circulator port and that generates a receive signal.

5. An RF transceiver according to claim 1 wherein the duplexer includes an antenna port, a transmit port and a receive port, wherein the third circulator port is coupled to the antenna port and wherein the receive port accepts the receive signal.

6. An RF transceiver according to claim 5 further comprising a resistor that is coupled to the transmit port.

7. A radio frequency (RF) transceiver comprising:
- means for circulating power from a first port to a second port to a third port and then to the first port;
- first and second amplifiers and a bandpass filter therebetween, the first amplifier being coupled to a transmit signal and the second amplifier being coupled to the first port;
- an antenna that is coupled to the second port; and
- duplexing means for generating a receive signal, the duplexing means being coupled to the third port.

8. An RF transceiver according to claim 7 wherein the duplexing means includes an antenna port, a transmit port and a receive port, wherein the third port is coupled to the antenna port and wherein the receive port accepts the receive signal.

9. An RF transceiver according to claim 8 further comprising means for dissipating power that is coupled to the transmit port.

10. A radio frequency (RF) transceiver comprising:
- an antenna;
- a transmit chain that transmits a transmit signal to the antenna, the transmit chain including first and second amplifiers and a bandpass filter therebetween, the first amplifier being coupled to the transmit signal and the second amplifier being coupled to the first circulator port; and
- a receive chain that generates a receive signal from the antenna;
- wherein the receive chain includes a duplexer and the transmit chain is free of a duplexer.

11. An RF transceiver according to claim 10 further comprising:
- a circulator including first, second and third circulator ports, that circulates power from the first circulator port to the second circulator port to the third circulator port and then to the first circulator port;
- wherein the antenna is coupled to the second circulator port, wherein the transmit chain includes the first and second circulator ports and wherein the receive chain includes the second and third circulator ports.

12. An RF transceiver according to claim 11 wherein the duplexer is coupled to the third circulator port.

* * * * *